United States Patent Office 2,714,935
Patented Aug. 9, 1955

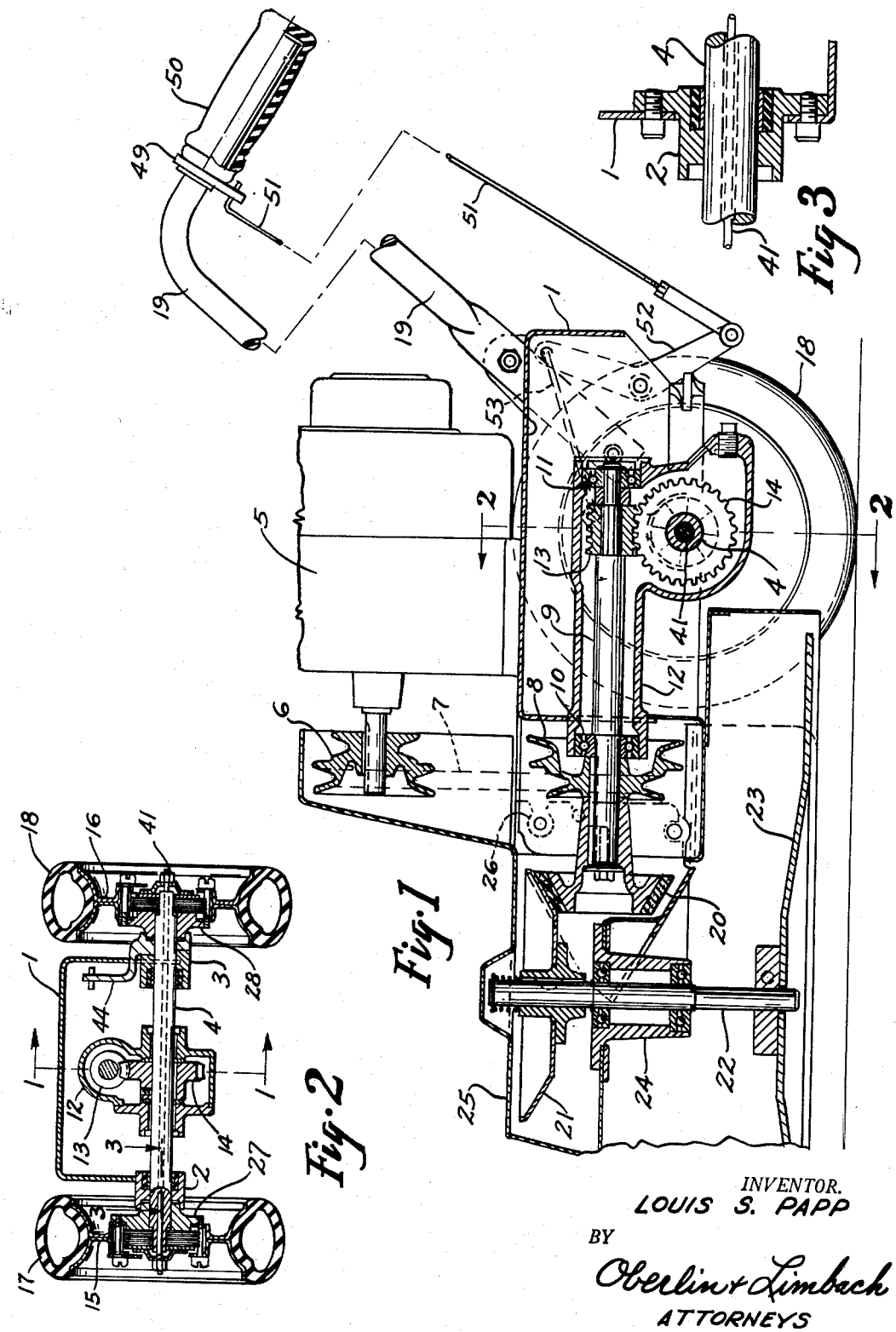

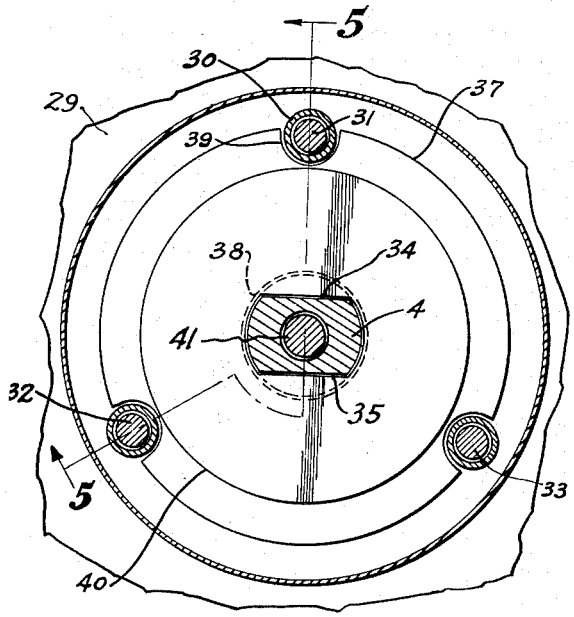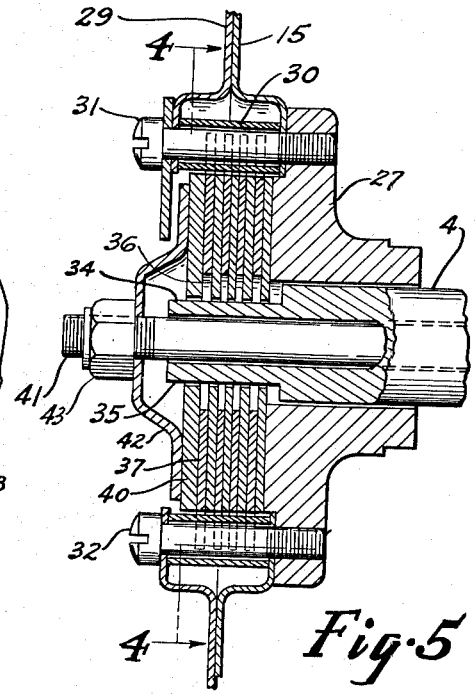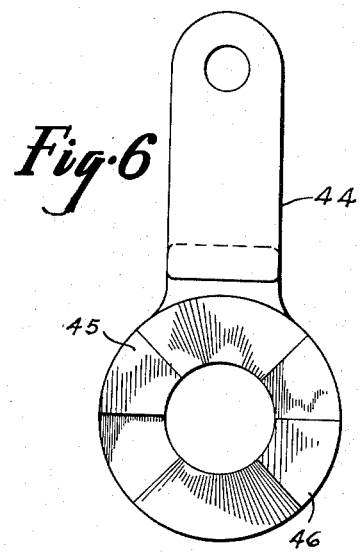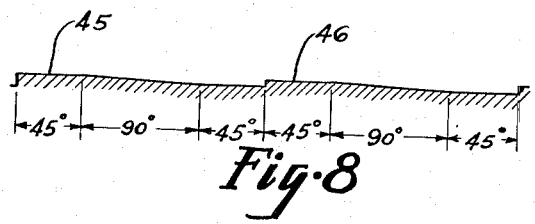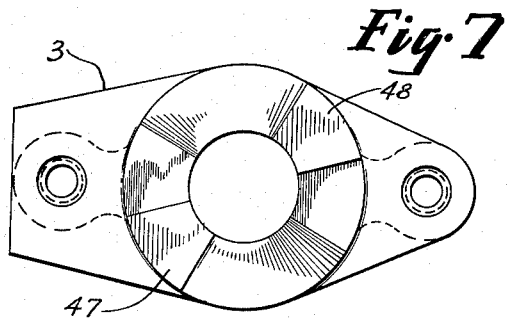

2,714,935

TRACTOR WHEEL CARRIED CLUTCHES AND OPERATING LINKAGE THEREFOR

Louis S. Papp, Chesterland, Ohio, assignor to The Motch & Merryweather Machinery Company, Cleveland, Ohio, a corporation of Ohio Application December 22, 1953, Serial No. 399,711

5 Claims. (Cl. 180—19)

This invention relates as indicated to a novel clutch particularly suitable for employment in garden tractors and the like since it is adapted for quick and easy engagement and disengagement by an operator and affords relatively smooth jolt-free starting over a long useful life.

Garden tractors are ordinarily powered by small gasoline engines which may serve not only to drive the tractor wheels but also to operate various accessory devices such as lawn mowers, snow blowers, cultivators and the like. When starting from a standstill, a very considerable strain may be thrown upon the engine with a resultant tendency to stall the same, and this problem has usually been taken care of by the employment of a rather loose belt drive which may slip when the motor is overloaded. Such devices are not very efficient, however, and result in excessive wear. It is accordingly a principal object of my invention to provide a novel clutch particularly adapted for use in small garden tractors and the like which will be relatively smooth acting when engaged and will reduce the tendency toward stalling the motor under initial high load.

Another object is to provide such clutch which will comprise a portion of the wheel assembly, facilitating maintenance, adjustment and repair.

A further object is to provide such wheel clutch with actuating mechanism adapted to actuate the clutch in each wheel assembly simultaneously for uniform engagement and disengagement of the drive to the respective wheels.

Still another object is to provide such wheel clutch assembly which will be largely self-adjusting and will not be affected in efficiency of operation by a substantial amount of wear in use.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a side view largely in longitudinal section of a garden tractor having my new wheel clutch incorporated therein;

Fig. 2 is a vertical transverse section through the wheel assemblies taken on the line 2—2 on Fig. 1;

Fig. 3 is a fragmentary detail view of a rear axle bearing taken on the line 3—3 on Fig. 2;

Fig. 4 is an end view of the axle and clutch assembly mounted thereon taken on the line 4—4 on Fig. 5;

Fig. 5 is a section taken longitudinally of such axle and clutch assembly on the line 5—5 on Fig. 4;

Fig. 6 is a detail view of the clutch operating lever;

Fig. 7 is a detail view of the right-hand axle support or journal member showing the cam surface thereof adapted to be opposed to the corresponding surface of the lever member of Fig. 6; and Fig. 8 is a projection of such cam surface.

Referring now more particularly to said drawing, the garden tractor there illustrated comprises a pressed sheet metal frame 1 provided with bearings 2 and 3 in which axle 4 is journalled. A small gasoline engine 5 such as the well-known Clinton or Briggs & Stratton engine is mounted on chassis 1 and drives a pulley 6 adapted to be connected by means of belt 7 to a pulley 8 keyed to main drive shaft 9. Such drive shaft is journalled in bearings 10 and 11 within housing 12 and is provided with a worm 13 in driving engagement with worm gear 14 keyed to axle 4. Wheels 15 and 16 are mounted on the respective ends of such axle in a manner described below and are provided with the usual pneumatic or semi-pneumatic tires 17 and 18.

A pair of handles such as 19 may be provided to facilitate control by an operator walking behind the tractor. The forward end of drive shaft 9 carries a truncated conical friction drive member 20 adapted to engage and drive a similar conical or beveled member 21 keyed to vertical shaft 22 on the lower end of which is mounted a rotary scythe 23. Shaft 21 is journalled in bearing 24 carried by sheet metal housing and frame 25, the latter being releasably rigidly latched to the forepart of the tractor frame or chassis 1 at 26 in the manner explained in detail in my co-pending application Serial No. 343,333 filed March 19, 1953. It will be appreciated that various other power driven tools may similarly be mounted on the forward end of my tractor.

In view of the drive means described above, axle 4 will normally be turning whenever motor 5 is operating. Wheels 15 and 16 comprise sheet metal discs bolted to hub members 27 and 28 freely rotatably mounted on axle 4 as best illustrated in Fig. 5. Outer discs such as 29 cooperate in forming the rims carrying tires 17 and 18 and are spaced from wheel discs 15 and 16 by tubular washers such as 30 encircling bolts 31, 32 and 33. The outer end portions of axle 4 are provided with flats such as 34 and 35 which fit a number of clutch plates or discs such as 36 so that such discs are caused to turn with rotation of the axle. Interposed between such discs 36 are other discs 37 provided with central openings 38 sufficiently large to clear such end portions of axle 4. Plates or discs 37 are notched at their outer peripheries as at 39 to engage washers or sleeves 30 encircling bolts 31, 32 and 33 whereby such plates are properly located and held against rotation relative to the wheels. An outer annular metal disc 40 fits over the axle end.

As above indicated, axle 4 is tubular and an axially reciprocable rod 41 extends therethrough with dished sheet metal hub caps such as 42 being secured at its respective ends by means of nuts 43 with such caps engaging and bearing against the outer faces of annular discs 40. In the case of the left-hand wheel (Fig. 5), it will thus be seen that shifting of rod 41 to the right will act to force the series of clutch plates 36 and 37 together so that the wheel will be caused to turn with the axle, and similarly when rod 41 is shifted to the left, the wheel will be disengaged and axle 4 with its associated clutch plates 36 may turn without driving the tractor.

Clutch actuating means is provided effective to control the clutch in the left-hand wheel as above indicated and also to cause the right-hand wheel to be engaged and disengaged simultaneously therewith. An offset lever 44 (Figs. 2 and 6) is freely rotatably mounted on axle 4 intermediate right-hand wheel hub 28 and journal 3. The face of the portion of lever member 44 encircling axle 4 and opposed to journal 3 is provided with a cam surface (Figs. 6 and 8) having diametrically opposite high portions 45 and 46 and the corresponding face of journal member 3 is provided with a similar cam surface with the high portions 47 and 48 normally offset 45°. A link and lever system is provided for rocking lever 44 comprising an eccentric 49 mounted on handle 19 for rotation with hand grip 50. A link 51 pivotally connects such eccentric to a bell crank 52 mounted on the side of frame or chassis 1 and pivotally connected by means of link 53 to the end of lever 44. Accordingly, the operator may conveniently oscillate lever 44 to bring the highs 45 and 46 of its cam surface into opposition to the highs 47 and 48 of the cam surface on journal member 3 and by so doing, cause lever 44 to be cammed to the right as viewed in Fig. 2 correspondingly to shift wheel hub 28 to the right. This action, of course, causes rod 41 to be shifted to the right to engage the clutch of the left-hand wheel as above described, and it also causes the similar clutch plate assembly in the right-hand wheel simultaneously to be engaged with equal pressure so that both wheels begin to turn at the same moment.

It will accordingly be seen that my new tractor utilizes a longitudinally extending drive shaft from one end of which power may be taken continuously to drive an attached tool such as a rotary scythe, lawn mower, snow blower or the like and at the other end of which the wheel axle may continuously be driven. When my new clutch is disengaged to stop the forward progress of the vehicle, the drive to the rotary tool need not be likewise disengaged nor need any gearing be thrown in and out of gear. The tractor is smoothly and quickly stopped and started again under immediate control of the operator.

The term "vehicle" as used herein and in the claims is intended to include walking tractors and the like as well as tractors and other machines adapted to carry a rider.

Other modes of applying the principle of the invention may be employed, change being made as regards the details described, provided the features stated in any of the following claims or the equivalent of such be employed.

I therefore particularly point out and distinctly claim as my invention:

1. In a garden tractor having an engine, a rotatably mounted tubular axle, drive means interconnecting said engine and axle for continuous rotation of the latter during operation of the engine, and wheels freely rotatably mounted on the respective end portions of said axle; a rod passing through said axle, clutch plates of friction material secured on the end portions of said axle for rotation therewith, annular clutch plates secured to said wheels for rotation therewith and interleaved with said first clutch plates adapted drivingly to engage the same only under the action of axial compressive force, a clamping plate on each end of said rod adapted to engage such respective clutch plate assemblies, securing means on the respective ends of said rod adapted to engage said respective clamping plates to secure said wheels on said axle but normally affording insufficient axial compressive force to interengage said clutch plates to drive said wheels with said axle, cam means rotatably mounted on said axle adapted to engage one said wheel to shift the latter toward the respective said clamping plate to interengage the clutch plates of its clutch assembly and also by the resultant pull imposed on said rod acting simultaneously to interengage the clutch plates of the other assembly, and manually operable link and lever means for rotating said cam.

2. In a power driven tractor having an engine, a rotatably mounted tubular axle, drive means interconnecting said engine and axle for continuous rotation of the latter during operation of the engine, and wheels freely rotatably mounted on the respective end portions of said axle; a rod passing through said axle, clutch plates of friction material secured on the end portions of said axle for rotation therewith, annular clutch plates secured to said wheels for rotation therewith and interleaved with said first clutch plates adapted drivingly to engage the same only under the action of axial compressive force, a clamping plate on each end of said rod adapted to engage such respective clutch plate assemblies, securing means on the respective ends of said rod adapted to engage said respective clamping plates to secure said wheels on said axle but normally affording insufficient axial compressive force to interengage said clutch plates to drive said wheels with said axle, bearings on the tractor frame journalling said axle, cam means rotatably mounted on said axle intermediate one said bearing and one said wheel adapted when rocked to engage said wheel to shift the latter toward the respective said clamping plate to interengage the clutch plates of its clutch assembly and also by the resultant pull imposed on said rod acting simultaneously to interengage the clutch plates of the other assembly, and manually operable link and lever means for rotating said cam.

3. In a self-propelled vehicle having a frame, an engine carried thereby, a rotatably mounted tubular axle, drive means interconnecting said engine and axle for continuous rotation of the latter during operation of the engine, and wheels freely rotatably mounted on the respective end portions of said axle; a rod passing through said axle, clutch plates of friction material secured on the end portions of said axle for rotation therewith, clutch plates secured to said wheels for rotation therewith and adapted drivingly to engage said first clutch plates only under the action of axial compressive force, retaining means on the ends of said rod adapted to hold said wheels on said axle and when reciprocated relative to a wheel to press said clutch plates together, bearings on said frame journalling said axle, cam means rotatably mounted on said axle intermediate one said bearing and one said wheel adapted when rocked to engage said bearing and wheel to shift the latter toward the respective retaining means to engage the clutch plates of its clutch assembly and also by the resultant pull imposed on said rod acting simultaneously to engage the clutch plates of the other assembly, and manual means for rocking said cam.

4. In a self-propelled vehicle having a frame, an engine carried thereby, a rotatably mounted tubular axle, drive means interconnecting said engine and axle for rotation of the latter, and wheels freely rotatably mounted on the respective end portions of said axle; a rod passing through said axle, clutch plates of friction material secured on the end portions of said axle for rotation therewith, clutch plates secured to said wheels for rotation therewith and adapted drivingly to engage said first clutch plates only under the action of axial compressive force, retaining means on the ends of said rod adapted to hold said wheels on said axle and when reciprocated relative to a wheel to press said clutch plates together, bearings on said frame journalling said axle, and means operative to shift one said wheel outwardly to engage the clutch plates of its clutch assembly and also by the resultant pull imposed on said rod acting simultaneously to engage the clutch plates of the other clutch assembly.

5. In a self-propelled vehicle having a frame, an engine carried thereby, a rotatably mounted tubular axle, drive means interconnecting said engine and axle for rotation of the latter, and wheels freely rotatably mounted on the respective end portions of said axle; a rod passing through said axle, clutch means for each of said wheels adapted to engage the latter to said axle upon shifting of said wheels longitudinally of said axle, means on the ends of said rod adapted to engage said respective wheels to limit shifting of one wheel relative to the other, and means operative to shift one said wheel longitudinally of said axle to engage its clutch means and also through said rod to shift the other said wheel likewise to engage its respective clutch means.

References Cited in the file of this patent

UNITED STATES PATENTS

| | | |
|---|---|---|
| 1,138,452 | Casteran | May 4, 1915 |
| 1,313,396 | McCain | Aug. 19, 1919 |
| 1,438,486 | Gorman | Dec. 12, 1922 |
| 2,535,615 | Van Ausdall | Dec. 26, 1950 |
| 2,645,300 | Watts et al. | July 14, 1953 |